(12) United States Patent
Kim et al.

(10) Patent No.: US 12,040,490 B2
(45) Date of Patent: Jul. 16, 2024

(54) ANODE INCLUDING MATERIAL LAYERS WITH DIFFERENT $I_D/I_G$ RATIOS, LITHIUM SECONDARY BATTERY INCLUDING THE SAME

(71) Applicant: SK On Co., Ltd., Seoul (KR)

(72) Inventors: Hyo Mi Kim, Daejeon (KR); Kwang Ho Jeong, Daejeon (KR); Da Bin Chung, Daejeon (KR); Hae Suk Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 229 days.

(21) Appl. No.: 17/357,254

(22) Filed: Jun. 24, 2021

(65) Prior Publication Data

US 2021/0408546 A1    Dec. 30, 2021

(30) Foreign Application Priority Data

Jun. 26, 2020 (KR) .................. 10-2020-0078448

(51) Int. Cl.
*H01M 4/62* (2006.01)
*H01M 10/0525* (2010.01)

(52) U.S. Cl.
CPC ....... *H01M 4/622* (2013.01); *H01M 10/0525* (2013.01)

(58) Field of Classification Search
CPC ...... H01M 4/133; H01M 4/366; H01M 4/583; H01M 4/622; H01M 10/0525
USPC .............................................. 429/209, 231.8
See application file for complete search history.

(56) References Cited

U.S. PATENT DOCUMENTS

| | | | | |
|---|---|---|---|---|
| 2018/0219217 A1* | 8/2018 | Park | ................. | H01M 4/133 |
| 2019/0305308 A1* | 10/2019 | Lee | ................. | H01M 4/621 |
| 2020/0194796 A1* | 6/2020 | Sun | ................. | H01M 4/625 |
| 2020/0313176 A1* | 10/2020 | Wang | ................. | H01M 4/133 |
| 2020/0403221 A1* | 12/2020 | Niina | ................. | H01M 4/587 |
| 2021/0336244 A1* | 10/2021 | Kang | ................. | H01M 4/366 |
| 2022/0263063 A1* | 8/2022 | Lee | ................. | H01M 4/133 |

FOREIGN PATENT DOCUMENTS

| | | | | | |
|---|---|---|---|---|---|
| CN | 109616614 A | * | 4/2019 | ........ | H01M 10/0525 |
| CN | 109841794 A | * | 6/2019 | ........ | H01M 10/0525 |
| CN | 110581254 A | * | 12/2019 | ............ | H01M 4/13 |

(Continued)

*Primary Examiner* — Sean P Cullen
(74) *Attorney, Agent, or Firm* — The Webb Law Firm

(57) ABSTRACT

An anode for a lithium secondary battery includes an anode current collector, and an anode active material layer disposed on the anode current collector. The anode active material layer includes a first anode active material layer including a first anode active material and a first binder that includes an acrylate-styrene butadiene copolymer, and a second anode active material layer disposed on the first anode material layer, the second anode active material layer including a second anode active material and a second binder that includes an acrylate-styrene-butadiene copolymer. A peak intensity ratio according to Raman spectroscopy of the first anode active material is smaller than the peak intensity ratio according to Raman spectroscopy of the second anode active material, and the peak intensity ratio according to Raman spectroscopy is represented as $I_D/I_G$.

11 Claims, 2 Drawing Sheets

(56) References Cited

FOREIGN PATENT DOCUMENTS

| | | | |
|---|---|---|---|
| JP | 2015138644 A * | 7/2015 | |
| KR | 1020050004930 A | 1/2005 | |
| KR | 1020170111352 A | 10/2017 | |
| KR | 1020180087171 A | 8/2018 | |
| KR | 1020190134021 A | 12/2019 | |
| WO | WO-2018062836 A2 * | 4/2018 | ........ H01M 10/0525 |
| WO | WO-2019167613 A1 * | 9/2019 | ........ H01M 10/0525 |
| WO | WO-2020218780 A1 * | 10/2020 | ........ H01M 10/0525 |

\* cited by examiner

ANODE INCLUDING MATERIAL LAYERS WITH DIFFERENT $I_D/I_G$ RATIOS, LITHIUM SECONDARY BATTERY INCLUDING THE SAME

CROSS-REFERENCE TO RELATED APPLICATION

This application claims priority to Korean Patent Application No. 10-2020-0078448 filed Jun. 26, 2020, the disclosure of which is hereby incorporated by reference in its entirety.

BACKGROUND OF THE INVENTION

1. Field of the Invention

The present invention relates to an anode for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

For example, the lithium secondary battery may include an anode containing, e.g., a carbon-based material capable of adsorbing and releasing lithium ions, a cathode formed of a lithium-containing oxide, and a non-aqueous electrolyte containing a lithium salt dissolved in an organic solvent.

Amorphous carbon or crystalline carbon may be used as an anode active material, and crystalline carbon may be advantageous from an aspect of high capacity. Examples of crystalline carbon may include natural graphite and artificial graphite.

For example, Korean Published Patent Application No. 10-2005-0004930 discloses an anode active material including artificial graphite, which may not provide sufficient discharge capacity and power.

SUMMARY OF THE INVENTION

According to an aspect of the present invention, there is provided an anode for a lithium secondary battery having improved rapid charging property.

According to an aspect of the present invention, there is provided a lithium secondary battery including the anode for a lithium secondary battery.

According to exemplary embodiments, an anode for a lithium secondary battery includes an anode current collector, and an anode active material layer disposed on the anode current collector. The anode active material layer includes a first anode active material layer including a first anode active material and a first binder that includes an acrylate-styrene butadiene copolymer, and a second anode active material layer disposed on the first anode material layer. The second anode active material layer includes a second anode active material and a second binder that includes an acrylate-styrene butadiene copolymer. A peak intensity ratio according to Raman spectroscopy of the first anode active material is smaller than the peak intensity ratio according to Raman spectroscopy of the second anode active material, and the peak intensity ratio according to Raman spectroscopy is represented as $I_D/I_G$.

In some embodiments, the peak intensity ratio according to Raman spectroscopy of the first anode active material may be in a range from 0.1 to 0.4.

In some embodiments, the peak intensity ratio according to Raman spectroscopy of the second anode active material may be in a range from 0.4 to 1.5.

In some embodiments, a ratio of the peak intensity ratio according to Raman spectroscopy of the second anode active material relative to the peak intensity ratio according to Raman spectroscopy of the first anode active material may be in a range from 1.5 to 5.

In some embodiments, a content of repeating units derived from an acrylate monomer in the acrylate-styrene butadiene copolymer of the first binder may be smaller than that of the second binder.

In some embodiments, the content of the repeating units derived from the acrylate monomer in the acrylate-styrene butadiene copolymer may be from 5 wt % to 30 wt % in the first binder, and may be from 45 wt % to 90 wt % in the second binder.

In some embodiments, a ratio of the content of the repeating units derived from the acrylate monomer in the acrylate-styrene butadiene copolymer of the second binder relative to the content of the repeating units derived from the acrylate monomer in the acrylate-styrene butadiene copolymer of the first binder may be greater than 1, and equal to or less than 10.

In some embodiments, a content of the first binder may be 1.5 wt % or less based on a total weight of the first anode active material layer.

In some embodiments, a content of the second binder may be from 1 wt % to 3 wt % based on a total weight of the second anode active material layer.

In some embodiments, a first peak intensity ratio measured by X-ray diffraction of the first anode active material may be in a range from 0.001 to 0.012, and the first peak intensity ratio measured by X-ray diffraction of the second anode active material may be in a range from 0.013 to 0.05. The first peak intensity ratio measured by X-ray diffraction is represented as I(110)/I(002) obtained in an X-ray diffraction analysis.

In some embodiments, a second peak intensity ratio measured by X-ray diffraction of the first anode active material may be in a range from 0.1 to 0.35, and the second peak intensity ratio measured by X-ray diffraction of the second anode active material may be in a range from 0.4 to 1.0. The second peak intensity ratio measured by X-ray diffraction is represented as I(110)/I(004) obtained in an X-ray diffraction analysis.

In some embodiments, a thickness of the second anode active material layer may be from 3% to 70% of a total thickness of the anode active material layer.

According to exemplary embodiments, a lithium secondary battery includes the anode according to embodiments as described above, and a cathode facing the anode.

An anode for a lithium secondary battery according to exemplary embodiments may include an anode current collector, a first anode active material layer disposed on the anode current collector and a second anode active material layer disposed on the first anode active material layer. The battery including the anode may have improved power and capacity properties such as a charging/discharging power and a rapid charging property.

For example, the first anode active material layer may include a first anode active material and a first binder, and the second anode active material layer may include a second anode active material and a second binder. For example, a peak intensity ratio ($I_D/I_G$) of the first anode active material according to Raman spectroscopy may be smaller than a peak intensity ratio ($I_D/I_G$) of the second anode active material according to Raman spectroscopy.

In this case, the first anode active material layer disposed on the anode current collector may include the first anode active material having a large basal plane area, and may have an enhanced adhesion to the anode current collector. The second anode active material layer disposed on the first anode active material layer may include the second anode active material having a large edge plane ratio that may be advantageous from an aspect of intercalation of lithium ions. Accordingly, the second anode active material layer may have a low resistance.

Accordingly, the anode active material layer having excellent adhesion to the anode current collector and having low resistance property may be achieved.

DESCRIPTION OF THE INVENTION

According to example embodiments of the present invention, an anode for a lithium secondary battery may include an anode current collector, a first anode active material layer having high adhesion property and a second anode active material layer having low resistance property. The anode for a lithium secondary battery may have improved adhesion between the anode current collector and an anode active material layer and may provide enhance rapid charging property in the lithium secondary battery.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
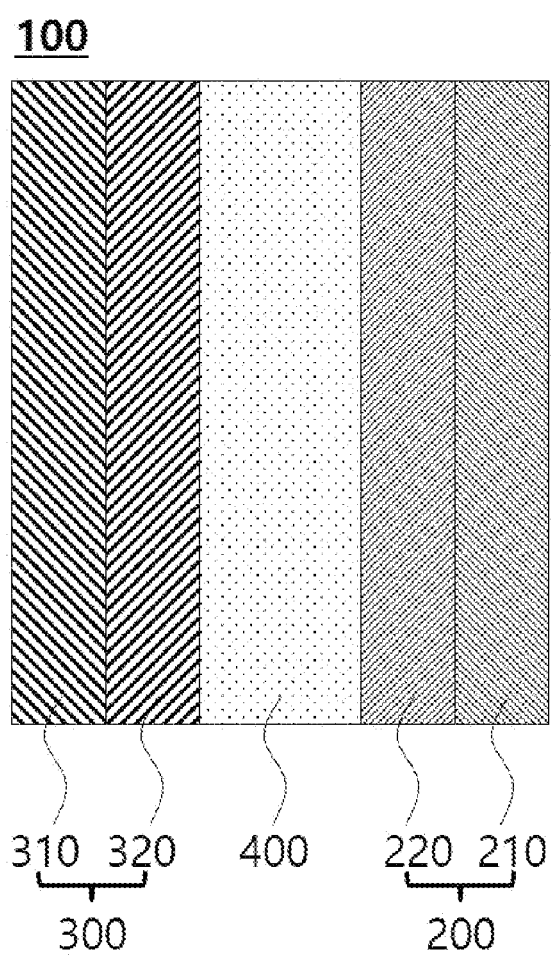
FIG. 1 is a schematic cross-sectional view illustrating a construction of a lithium secondary battery in accordance with exemplary embodiments.

FIG. 1 is a schematic cross-sectional view illustrating a construction of a lithium secondary battery in accordance with exemplary embodiments.

Referring to FIG. 1, a lithium secondary battery 100 may include an anode 200 for a lithium secondary battery (hereinafter, abbreviated as an anode), a cathode 300 and a separation layer 400 interposed between the anode 200 and the cathode 300.

An electrode assembly may be defined by the anode 200, the cathode 300 and the separation layer 400. The lithium secondary battery 100 may further include a battery case in which the electrode assembly is inserted, and a non-aqueous electrolyte injected into the battery case.

An outer shape of the lithium secondary battery of the present invention is not particularly limited, but may be a cylindrical shape using a can, a square shape, a pouch type, a coin type, etc.

For example, the anode 200 may include an anode current collector 210 and an anode active material layer 220.

The anode current collector 210 may include copper or a copper alloy; stainless-steel, nickel, titanium or an alloy thereof; copper or stainless-steel surface-treated with carbon, nickel, titanium, silver or the like, etc.

For example, an anode active material, a binder, a solvent may be mixed or stirred optionally with a conductive agent, a dispersive agent, etc., to form a slurry. The slurry may be coated on the current collector and pressed to form the anode active material layer 220.

The solvent may include a non-aqueous solvent. The non-aqueous solvent may include, e.g., N-methyl-2-pyrrolidone (NMP), dimethylformamide, dimethylacetamide, N,N-dimethylaminopropylamine, ethylene oxide, tetrahydrofuran, etc.

The conductive agent may include a conductive carbon-based material.

Composition, property and structure of the anode active material layer 220 will be described in more detail with reference to FIG. 2 below.

For example, the cathode 300 may include a cathode current collector 310 and a cathode active material layer 320. For example, the cathode 300 may be fabricated by coating a cathode active material on the cathode current collector 310.

The cathode current collector 310 may include aluminum or an aluminum alloy; stainless-steel, nickel, titanium or an alloy thereof; aluminum or stainless-steel surface-treated with carbon, nickel, titanium, silver or the like, etc.

The cathode active material widely used in the related art may be used in a formation of the cathode active material layer 320. In an embodiment, the cathode active material may include a lithium composite oxide containing at least one of cobalt, manganese and nickel. For example, compounds represented by the following chemical formulas may be used as the lithium composite oxide.

$$Li_xMn_{1-y}M_yA_2$$

$$Li_xMn_{1-y}M_yO_{2-z}X_z$$

$$Li_xMn_2O_{4-z}X_z$$

$$Li_xMn_{2-y}M_yM'_zA_4$$

$$Li_xCo_{1-y}M_yA_2$$

$$Li_xCo_{1-y}M_yO_{2-z}X_z$$

$$Li_xNi_{1-y}M_yA_2$$

$$Li_xNi_{1-y}M_yO_{2-z}X_z$$

$$Li_xNi_{1-y}Co_yO_{2-z}X_z$$

$$Li_xNi_{1-y-z}Co_yM_zA_\alpha$$

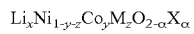

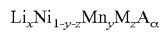

In the chemical formulae above, 0.9≤x≤1.1, 0≤y≤0.5, 0≤z≤0.5, 0≤α≤2.2, and M and M' may be the same as or different from each other. M and M' may be selected from the group consisting of Mg, Al, Co, K, Na, Ca, Si, Ti, Sn, V, Ge, Ga, B, As, Zr, Mn, Cr, Fe, Sr, V and a rare earth metal element, A may be selected from the group consisting of O, F, S and P, and X may be selected from the group consisting of F, S and P.

For example, the cathode active material, a binder, a solvent may be mixed or stirred optionally with a conductive agent, a dispersive agent, etc., to form a slurry. The slurry may be coated on the cathode current collector 310, and dried and pressed to form the cathode active material layer 320.

The solvent may include a non-aqueous solvent. The non-aqueous solvent may include, e.g., N-methyl-2-pyrrolidone (NMP), dimethylformamide, dimethylacetamide, N,N-dimethylaminopropylamine, ethylene oxide, tetrahydrofuran, etc.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR).

For example, the binder may be used with a thickener such as carboxymethyl cellulose (CMC).

The conductive agent may include a conductive carbon-based material.

For example, the separation layer 400 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 400 may also be formed from a non-woven fabric including a glass fiber with a high melting point, a polyethylene terephthalate fiber, or the like.

The separation layer 400 may be applied to the battery by winding, laminating, stacking, folding, etc.

For example, the non-aqueous electrolyte solution may include a lithium salt and an organic solvent.

The lithium salt commonly used in the electrolyte for the lithium secondary battery may be used, and may be represented by Li+X−.

An anion of the lithium salt X− may include, e.g., F−, Cl−, Br−, I−, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

Figure 2:
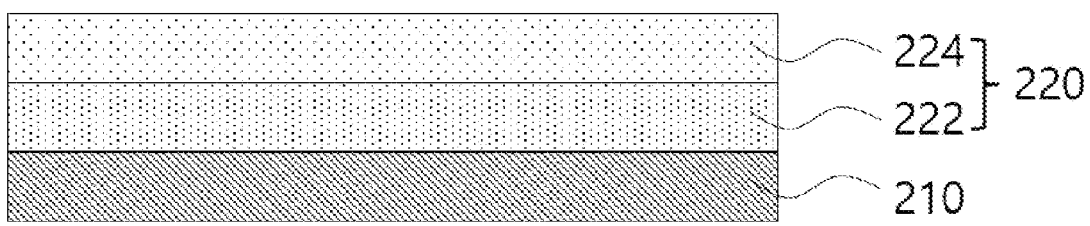
FIG. 2 is a schematic cross-sectional view illustrating a construction of an anode for a lithium secondary battery in accordance with exemplary embodiments.

FIG. 2 is a schematic cross-sectional view illustrating a construction of an anode for a lithium secondary battery in accordance with exemplary embodiments.

Referring to FIG. 2, the anode for a lithium secondary battery according to exemplary embodiments may include an anode current collector 210, a first anode active material layer 222 disposed on the anode current collector 210 and a second anode active material layer 224 disposed on the first anode active material layer 222.

For example, the first anode active material layer 222 may include a first negative active material and a first binder including an acrylate-styrene butadiene copolymer. For example, the second anode active material layer 224 may include a second anode active material and a second binder including an acrylate-styrene butadiene copolymer.

In exemplary embodiments, a peak intensity ratio ($I_D/I_G$) according to a Raman spectroscopy of the first anode active material may be smaller than a peak intensity ratio ($I_D/I_G$) according to a Raman spectroscopy of the second anode active material.

For example, the anode active material may include a graphite-based particle. The graphite-based particle may indicate a particle in which at least a portion of a surface may be graphite. The graphite particle may include an artificial graphite and a natural graphite. The artificial graphite may be prepared by graphitizing a graphite precursor at a temperature of 150° C. or more, preferably from about 2,800° C. to 3,200° C. The graphite precursor may include cokes, mesophase carbon such as mesophase microbead and bulk mesophase, etc. The natural graphite may include a flake-type natural graphite, a bulk-type natural graphite, a spherical natural graphite prepared by grinding, assembling and spheroidizing the flake-type natural graphite.

For example, the graphite-based particle may be prepared by a chemical or physical treatment. Non-limiting examples of the chemical or physical treatment may include pulverization, classification, assembly, lamination, compression, compounding, mixing, coating, oxidation, deposition, mechano-chemical treatment, chamfering, spheroidization, curvature, annealing, etc.

In a measurement of the peak intensity ratio ($I_D/I_G$) according to the Raman spectroscopy, mapping of a plurality of points of the anode 200 may be performed so that a D band intensity ($I_D$) and a G band intensity ($I_G$) of the anode active material for each point may be measured. Thereafter, an average value of ratios of the D band intensity ($I_D$) relative to the G band intensity ($I_G$) may be used as the peak intensity ratio ($I_D/I_G$).

For example, the D band may mean a peak intensity in a region of 1,300 to 1,420 cm$^{-1}$ of a spectrum measured at an excited wavelength of 532 nm using a Raman spectroscopy device. For example, the G band may mean a peak intensity at 1,540 to 1,620 cm$^{-1}$ of a spectrum measured at an excited wavelength of 532 nm using a Raman spectroscopy device.

For example, as the peak intensity ratio ($I_D/I_G$) according to the Raman spectroscopy becomes smaller, a basal plane of the anode active material may become longer. Conversely, as the peak intensity ratio ($I_D/I_G$) according to the Raman spectroscopy becomes larger, an area of an edge plane exposed in the anode active material may become greater.

In some embodiments, the first anode active material layer 222 disposed on the anode current collector 210 may include an anode active material having a relatively long basal plane, and the second anode active material layer 224 disposed on the first anode active material layer 222 may include an anode active material having a relatively large area of the exposed edge plane.

For example, the anode active material having the relatively large area of the exposed edge plane in the second anode active material layer 224 may easily perform an intercalation of lithium ions. Accordingly, a low resistance property of the second anode active material layer 224 may be improved.

Further, the anode active material having the relatively long basal plane in the first anode active material layer 222 may easily enhance an adhesion between the first anode active material layer 222 and the anode current collector.

For example, the peak intensity ratio ($I_D/I_G$) of the first anode active material according to the Raman spectroscopy may be from about 0.1 to 0.4. For example, within the above range of the peak intensity ratio ($I_D/I_G$), a crystal length of the first anode active material may be increased. Accordingly, the adhesion property of the first anode active material layer 222 including the first anode active material may be further improved.

For example, the peak intensity ratio ($I_D/I_G$) of the second anode active material according to the Raman spectroscopy may be from about 0.4 to 1.5. For example, within the above range of the peak intensity ratio ($I_D/I_G$) of the second anode active material, the area of the exposed edge plane of the second anode active material may be increased. Accordingly, the intercalation of the lithium ions may be easily implemented through the second anode active material, so that the low resistance property of the second anode active material layer 224 including the second anode active material may be further improved.

For example, if the peak intensity ratio ($I_D/I_G$) according to the Raman spectroscopy of the second anode active material exceeds 1.5, high-temperature storage, rapid charging life-span and normal life-span properties may be deteriorated.

In some embodiments, a ratio of the peak intensity ratio ($I_D/I_G$) according to the Raman spectroscopy of the second anode active material relative to the peak intensity ratio ($I_D/I_G$) according to the Raman spectroscopy of the first anode active material may be from about 1.5 to 5.

For example, within the range of the ratio of the peak intensity ratio ($I_D/I_G$), the anode active material layer having the low resistance property and the improved adhesion with the anode current collector may be effectively achieved.

In some embodiments, a first peak intensity ratio represented by I(110)/I(002) and measured by an X-ray diffraction method of the first anode active material may be from about 0.001 to 0.012. A first peak intensity ratio I(110)/I(002) measured by the X-ray diffraction method of the second anode active material may be from about 0.013 to 0.05.

In some embodiments, a second peak intensity ratio represented by I(110)/I(004) and measured by the X-ray diffraction method of the first anode active material may be from about 0.1 to 0.35, and a second peak intensity ratio represented by I(110)/I(004) and measured by the X-ray diffraction method of the second anode active material may be from about 0.4 to 1.0.

For example, the first peak intensity ratio I(110)/I(002) and the second peak intensity ratio I(110)/I(004) measured by the X-ray diffraction method may be calculated from values of a peak intensity of a carbon 002 plane (I(002)), a peak intensity of a carbon 004 plane (I(004)) and a peak intensity on a carbon 110 plane (I(110)) measured by the following measurement conditions in an X-ray diffraction device.

[Measurement Conditions]
Target: Cu
Power of X-ray: 40 kV, 100 mA
Measurement range: 2θ=20° to 80°
Step angle: 0.02°
Counting time per 1 step: 3 seconds For example, if the first peak intensity ratio I(110)/I(002) of the first anode active material is from about 0.001 to 0.012, or the second peak intensity ratio I(110)/I(004) of the first anode active material is from about 0.1 to 0.35, the anode active material may have a crystal structure having a large crystal length.

The first anode active material having the crystal structure with the large crystal length may be included in the first anode active material layer 222, high capacity may be achieved from the anode active material layer 220 and the adhesion property between the anode current collector 210 and the anode active material layer 220 may be further improved.

For example, if the first peak intensity ratio I(110)/I(002) of the second anode active material is from about 0.013 to 0.05, or the second peak intensity ratio I(110)/I(004) of the second anode active material is from about 0.4 to 1.0, the area of the exposed edge plane of the second anode active material may increase, and the second anode active material may have an amorphous structure.

The intercalation of the lithium ions may be efficiently performed through the second anode active material having the large area of the edge plane and having the amorphous structure. Thus, the low resistance property of the second anode active material layer 224 may be further improved.

In some embodiments, the first binder may have a smaller content of repeating units derived from an acrylate monomer in the acrylate-styrene butadiene copolymer than that in the second binder.

For example, the content of repeating units derived from the acrylate monomer in the acrylate-styrene butadiene copolymer may be from about 5 weight percent (wt %) to 30 wt % in the first binder, and from about 45 wt % to 90 wt % in the second binder.

For example, if the content of the repeating units derived from the acrylate monomer in the acrylate-styrene-butadiene copolymer in the second binder is from about 45 wt % to 90 wt %, the low resistance property of the anode active material layer 220 may be improved. If the content of the repeating units derived from the acrylate monomer in the acrylate-styrene butadiene in the first binder is from about 5 wt % to 30 wt %, the adhesion properties between the anode active material layer 220 and the anode current collector 210 may be improved.

For example, the first anode active material layer 222 disposed on the anode current collector 210 may include the acrylate-styrene butadiene copolymer having the content from about 5 wt % to 30 wt % of the repeating units derived from the acrylate monomer, so that the adhesion between the anode current collector 210 and the first anode active material layer 222 may be improved.

For example, the second anode material layer 224 disposed on the first anode active material layer 222 may include the acrylate-styrene butadiene copolymer having the content from about 45 wt % to 90 wt % of the repeating units derived from the acrylate monomer, so that the low resistance property of the anode active material layer 220 may be improved.

Accordingly, the anode active material layer 220 having improved rapid charging and low resistance properties while having the improved adhesion to the anode current collector 210 may be efficiently achieved.

In some embodiments, the content of the first binder may be from about 1.5 wt % or less based on a total weight of the first anode active material layer 222. For example, within the above range, resistance increase in the anode active material layer 220 due to the acrylate-styrene butadiene copolymer having a relatively low content of the repeating units derived from the acrylate monomer may be effectively prevented.

A lower limit of the content of the first binder is not particularly limited. The first binder may be included by an amount for sufficiently maintaining the function of the electrode, and may be, e.g., from about 0.1 wt % or more based on the total weight of the first anode active material layer 222.

In some embodiments, a content of the second binder may be from about 1 wt % to 3 wt % based on a total weight of the second anode active material layer 224. For example, within the above range, the low resistance property of the anode active material layer 220 may be efficiently implemented.

In some embodiments, a ratio of the content of the repeating units derived from the acrylate monomer in the acrylate-styrene butadiene copolymer included in the second binder with respect to the content of the repeating units derived from the acrylate monomer in the acrylate-styrene butadiene copolymer included in the first binder may be greater than about 1 and may be less than or equal to 10.

For example, within the above range of the repeating units derived from the acrylate monomer between the first binder and the second binder, the anode active material layer 220 having the enhanced adhesion to the anode current collector 210 while having the low resistance may be efficiently implemented.

In some embodiments, the acrylate-styrene butadiene copolymer included in the first binder or the second binder may have a core-shell structure. In this case, a core of the acrylate-styrene butadiene copolymer may include styrene and/or butadiene, and a shell of the acrylate-styrene butadiene copolymer may include acrylate.

In some embodiments, the first anode active material layer or the second anode active material layer may further include least one selected from the group consisting of polyvinylidene fluoride and/or carboxymethyl cellulose as a sub-binder. For example, the adhesion property of the first anode active material layer or the low resistance property of the second anode active material layer may be further improved by the sub-binder.

In some embodiments, a thickness of the second anode active material layer 224 may be from about 3% to 70% of a total thickness of the anode active material layer 220. For example, within the thickness range of the second anode active material layer 224, the improved low resistance property may be more efficiently implemented from the anode active material layer 220.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

<Anode>
An artificial graphite having a single particle structure as a first anode active material and an acrylate-styrene-butadiene copolymer containing 25% of an acrylate monomer as a first binder were mixed, and then dispersed in distilled water from which ions were removed to prepare a first anode slurry. The first anode slurry was coated to one surface of a Cu-foil current collector to form a first anode active material layer. A content of the first binder was 1 wt % based on a total weight of the first anode active material layer. A peak intensity ratio ($I_D/I_G$) of the first anode active material measured from a Raman spectroscopy was 0.28.

Id was obtained from a peak intensity at 1,360 cm$^{-1}$ of a spectrum measured at an excited wavelength of 532 nm using a Raman spectroscopy device. $I_G$ was obtained from a peak intensity at 1,580 cm$^{-1}$ of a spectrum measured at an excited wavelength of 532 nm using the Raman spectroscopy device.

A first peak intensity ratio I(110)/I(002) measured by an X-ray diffraction analysis from the first anode active material was 0.007, and a second peak intensity ratio I(110)/I(004) measured by the X-ray diffraction analysis from the first anode active material was 0.173.

An artificial graphite having an assembly-type particle structure as a second anode active material and an acrylate-styrene-butadiene copolymer containing 55% of an acrylate monomer as a second binder were mixed, and then dispersed in distilled water from which ions were removed to prepare a second anode slurry. The second anode slurry was coated to one surface of the first anode active material layer to form a second anode material layer. A content of the second binder was 2 wt % based on a total weight of the second anode active material layer. A peak intensity ratio ($I_D/I_G$) of the second anode active material measured from a Raman spectroscopy was 0.69.

A first peak intensity ratio I(110)/I(002) measured by an X-ray diffraction analysis from the second anode active material was 0.014, and a second peak intensity ratio I(110)/I(004) measured by the X-ray diffraction analysis from the second anode active material was 0.363.

Thereafter, drying and pressing processes were performed to prepare an anode including an anode active material layer with a size of 10 cm×10 cm×50

A thickness of the first anode active material layer was 40% of a total thickness of the anode active material layer, and a thickness of the second anode active material layer was 60% of the total thickness of the anode active material layer.

<Cathode>
$Li_{1.0}Ni_{0.6}Co_{0.2}Mn_{0.2}O_2$ as a cathode active material, Denka Black™ as a conductive material, and PVDF as a binder and N-Methyl pyrrolidone as a solvent were mixed by a mass ratio of 46:2.5:1.5:50 to prepare a cathode slurry. "Denka Black" is a trademark of Denka Company Limited of Japan. The cathode slurry was coated on an aluminum substrate, and then dried and pressed to prepare a cathode.

<Fabrication of Battery>
The cathode and the anode obtained as described above were notched by a proper size and stacked, and a separator (polyethylene, thickness: 25 μm) was interposed between the cathode and the anode to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving 1M $LiPF_6$ in a mixed solvent of EC/EMC/DEC (25/45/30; volume ratio), and then 1.5 wt % of vinylene carbonate and 0.5 wt % of 1,3-propensultone (PRS) were added.

The lithium secondary battery as fabricated above was pre-charged by applying a pre-charging current (2.5 A) corresponding to 0.25 C for 36 minutes. After 1 hour, the battery was degased, aged for more than 24 hours, and then a formation charging-discharging (charging condition of CC-CV 0.2 C 4.2 V 0.05 C CUT-OFF, discharging condition of CC 0.2 C 2.5 V CUT-OFF) was performed.

Examples 2 to 14, and Comparative Example 1

Amounts and properties of the first binder and the first anode active material included in the first anode active material layer, and the second binder and the second anode active material included in the second anode active material layer, and thicknesses of the first anode active material layer and the second anode active material layer were changed from Example 1 as shown in Tables 1 and 2 below to form lithium secondary batteries.

Comparative Examples 2 and 3

Lithium secondary batteries were fabricated by the same method as that in Example 1 except that only the first anode active material layer was formed on the Cu-foil current collector (Comparative Example 2) or only the second anode active material layer was formed on the Cu-foil current collector (Comparative Example 3).

TABLE 1

| First Anode Active Material Layer | First Binder Content of Acrylate Monomer (%) | Content (%) | First Anode Active Material Raman ($I_D/I_G$) | XRD First Peak Intensity I(110)/I(002) | XRD Second Peak Intensity I(110)/I(004) | Thickness (%) |
|---|---|---|---|---|---|---|
| Example 1 | 25 | 2 | 0.28 | 0.0097 | 0.289 | 40 |
| Example 2 | 25 | 1 | 0.28 | 0.0097 | 0.289 | 40 |
| Example 3 | 25 | 2.5 | 0.28 | 0.0097 | 0.289 | 40 |
| Example 4 | 25 | 1.5 | 0.28 | 0.0097 | 0.289 | 40 |
| Example 5 | 25 | 2 | 0.28 | 0.0097 | 0.289 | 20 |
| Example 6 | 25 | 2 | 0.28 | 0.0097 | 0.289 | 95 |
| Example 7 | 4 | 2 | 0.28 | 0.0097 | 0.289 | 40 |
| Example 8 | 40 | 2 | 0.28 | 0.0097 | 0.289 | 40 |
| Example 9 | 25 | 2 | 0.28 | 0.0097 | 0.289 | 40 |
| Example 10 | 25 | 2 | 0.28 | 0.0097 | 0.289 | 40 |
| Example 11 | 25 | 2 | 0.05 | 0.004 | 0.09 | 40 |
| Example 12 | 25 | 2 | 0.5 | 0.015 | 0.434 | 40 |
| Example 13 | 25 | 2 | 0.28 | 0.0097 | 0.289 | 40 |
| Example 14 | 25 | 2 | 0.28 | 0.0097 | 0.289 | 40 |
| Comparative Example 1 | 70 | 1 | 0.69 | 0.014 | 0.363 | 70 |
| Comparative Example 2 | 25 | 3 | 0.28 | 0.0097 | 0.289 | 100 |
| Comparative Example 3 | — | — | — | — | — | — |

TABLE 2

| Second Anode Active Material Layer | Second Binder Content of Acrylate Monomer (%) | Content (%) | Second Anode Active Material Raman ($I_D/I_G$) | XRD First Peak Intensity I(110)/I(002) | XRD Second Peak Intensity I(110)/I(004) | Thickness (%) |
|---|---|---|---|---|---|---|
| Example 1 | 70 | 1 | 0.69 | 0.014 | 0.363 | 60 |
| Example 2 | 70 | 2 | 0.69 | 0.014 | 0.363 | 60 |
| Example 3 | 70 | 0.5 | 0.69 | 0.014 | 0.363 | 60 |
| Example 4 | 70 | 1.5 | 0.69 | 0.014 | 0.363 | 60 |
| Example 5 | 70 | 1 | 0.69 | 0.014 | 0.363 | 80 |
| Example 6 | 70 | 1 | 0.69 | 0.014 | 0.363 | 5 |
| Example 7 | 70 | 1 | 0.69 | 0.014 | 0.363 | 60 |
| Example 8 | 70 | 1 | 0.69 | 0.014 | 0.363 | 60 |
| Example 9 | 30 | 1 | 0.69 | 0.014 | 0.363 | 60 |
| Example 10 | 95 | 1 | 0.69 | 0.014 | 0.363 | 60 |
| Example 11 | 70 | 1 | 0.69 | 0.014 | 0.363 | 60 |
| Example 12 | 70 | 1 | 0.69 | 0.014 | 0.363 | 60 |
| Example 13 | 70 | 1 | 0.3 | 0.012 | 0.279 | 60 |
| Example 14 | 70 | 1 | 1.6 | 0.14 | 0.52 | 60 |
| Comparative Example 1 | 25 | 2 | 0.28 | 0.0097 | 0.289 | 30 |
| Comparative Example 2 | — | — | — | — | — | — |
| Comparative Example 3 | 70 | 3 | 0.7 | 0.014 | 0.363 | 100 |

Experimental Example

Adhesion forces and rapid charging properties of anodes and lithium secondary batteries prepared according to Examples and Comparative Examples were evaluated.

<Analysis on Adhesion Force of Anodes>

The anodes prepared according to Examples and Comparative Examples were cut into 18 mm in width/150 mm in length. A tape having a width of 18 mm was attached to the Cu-foil of the anode, and sufficiently adhered with a roller having a load of 2 kg. A double-sided tape was attached to one side of a tensile tester, and the anode active material layer was attached to the double-sided tape. The tape attached to the Cu-foil was coupled to an opposite side of the tensile tester and the adhesion force was measured.

<Evaluation on Rapid Charging Property>

Cells having a large capacity of 10 Ah or more were fabricated using the anodes prepared according to Examples and Comparative Examples and using the same cathode. A reference electrode was inserted between the cathode and the anode to obtain a three-electrode cell, and a potential of the anode was confirmed during charging using the three-electrode cell.

While CC charging the three-electrode cell with the reference electrode inserted at a C-rate of 0.75 C to 2.5 C to 4.2V, an SOC point where a CCV value of the anode for each C-rate became constant below 0V was detected. The SOC point was designated as a discharging limit, and step-charging protocols of Examples and Comparative Examples were designed.

Charging times of Comparative Examples and Examples were calculated using the step charging protocols prepared using the three-electrode cell, and capacity retentions were calculated by repeating a rapid charging-⅓C discharging for 200 cycles by applying each step charging protocol.

The results are shown in Table 3 below.

TABLE 3

| | Adhesion Force (N) | Rapid Charging Time (minutes) | Rapid Charging Capacity Retention (%) |
|---|---|---|---|
| Example 1 | 0.55 | 18.3 | 96.1 |
| Example 2 | 0.51 | 19.8 | 92.3 |
| Example 3 | 0.56 | 17.8 | 96.0 |
| Example 4 | 0.54 | 18.8 | 93.6 |
| Example 5 | 0.47 | 18.4 | 94.3 |
| Example 6 | 0.55 | 21.7 | 90.4 |
| Example 7 | 0.60 | 19.0 | 95.6 |
| Example 8 | 0.43 | 18.1 | 89.8 |
| Example 9 | 0.55 | 21.1 | 90.5 |
| Example 10 | 0.54 | 17.9 | 92.0 |
| Example 11 | 0.54 | 19.2 | 94.8 |
| Example 12 | 0.40 | 17.9 | 93.1 |
| Example 13 | 0.53 | 19.8 | 94.3 |
| Example 14 | 0.49 | 17.7 | 90.3 |
| Comparative Example 1 | 0.39 | 21.0 | 91.5 |
| Comparative Example 2 | 0.53 | 21.8 | 90.4 |
| Comparative Example 3 | 0.38 | 18.6 | 95.0 |

Referring to Table 3, in Examples where the second anode active material layer included the second binder containing the repeating unit derived from the acrylate monomer in a specific content range, and the second anode active material having the peak intensity ratio ($I_D/I_G$) of the Raman spectroscopy in a specific range, the rapid charging properties of the anode for the lithium secondary battery were more improved, and deterioration of the rapid charging properties was efficiently prevented even after repeated rapid charging and discharging.

Further, in Examples where the first anode active material layer included the first binder containing the repeating unit derived from the acrylate monomer in a specific content range, and the first anode active material having the peak intensity ratio ($I_D/I_G$) of the Raman spectroscopy in a specific range, the adhesion between the first anode active material layer and the anode current collector was improved.

What is claimed is:

1. An anode for a lithium secondary battery, comprising:
   an anode current collector;
   an anode active material layer disposed on the anode current collector, wherein the anode active material layer comprises:
   a first anode active material layer disposed between the anode current collector and a second anode active material layer, the first anode active material layer including a first anode active material and a first binder that includes a first acrylate-styrene butadiene copolymer; and
   the second anode active material layer directly disposed on the first anode active material layer, the second anode active material layer including a second anode active material and a second binder that includes a second acrylate-styrene butadiene copolymer,
   wherein a peak intensity ratio according to Raman spectroscopy of the first anode active material is smaller than the peak intensity ratio according to Raman spectroscopy of the second anode active material, and the peak intensity ratio according to Raman spectroscopy is represented as $I_D/I_G$,
   wherein a first peak intensity ratio measured by X-ray diffraction of the first anode active material is in a range from 0.001 to 0.012,
   the first peak intensity ratio measured by X-ray diffraction of the second anode active material is in a range from 0.013 to 0.05, and
   the first peak intensity ratio measured by X-ray diffraction is represented as I(110)/I(002) obtained in an X-ray diffraction analysis, wherein a second peak intensity ratio measured by X-ray diffraction of the first anode active material is in a range from 0.1 to 0.35,
   the second peak intensity ratio measured by X-ray diffraction of the second anode active material is in a range from 0.4 to 1.0, and
   the second peak intensity ratio measured by X-ray diffraction is represented as I(110)/I(004) obtained in the X-ray diffraction analysis.

2. The anode for a lithium secondary battery according to claim 1, wherein a thickness of the second anode active material layer is from 3% to 70% of a total thickness of the anode active material layer.

3. The anode for a lithium secondary battery according to claim 1, wherein the peak intensity ratio according to Raman spectroscopy of the first anode active material is in a range from 0.1 to 0.4.

4. The anode for a lithium secondary battery according to claim 1, wherein the peak intensity ratio according to Raman spectroscopy of the second anode active material is in a range from 0.4 to 1.5.

5. The anode for a lithium secondary battery according to claim 1, wherein a ratio of the peak intensity ratio according to Raman spectroscopy of the second anode active material relative to the peak intensity ratio according to Raman spectroscopy of the first anode active material is in a range from 1.5 to 5.

6. The anode for a lithium secondary battery according to claim 1, wherein a ratio of the content of the repeating units derived from the acrylate monomer in the second acrylate-styrene butadiene copolymer of the second binder relative to the content of the repeating units derived from the acrylate monomer in the first acrylate-styrene butadiene copolymer of the first binder is greater than 1, and equal to or less than 10.

7. The anode for a lithium secondary battery according to claim 1, wherein a content of the first binder is 1.5 wt % or less based on a total weight of the first anode active material layer.

8. The anode for a lithium secondary battery according to claim 1, wherein a content of the second binder is from 1 wt % to 3 wt % based on a total weight of the second anode active material layer.

9. The anode for a lithium secondary battery according to claim 1, wherein a content of repeating units derived from an acrylate monomer in the first acrylate-styrene butadiene copolymer of the first binder is smaller than a content of repeating units derived from an acrylate monomer in the second acrylate-styrene butadiene copolymer of the second binder.

10. The anode for a lithium secondary battery according to claim 9, wherein the content of the repeating units derived from the acrylate monomer in the first acrylate-styrene butadiene copolymer is from 5 wt % to 30 wt % in the first binder, and the content of the repeating units derived from the acrylate monomer in the second acrylate-styrene butadiene copolymer is from 45 wt % to 90 wt % in the second binder.

11. A lithium secondary battery, comprising:
the anode for a lithium secondary battery according to claim 1; and
a cathode facing the anode.

* * * * *